July 1, 1958     S. A. CAMP     2,841,093
HILL CLIMBING APPARATUS

Filed Oct. 29, 1953     8 Sheets-Sheet 4

INVENTOR.
SHERMAN A. CAMP
BY
ATTORNEYS

July 1, 1958  S. A. CAMP  2,841,093
HILL CLIMBING APPARATUS
Filed Oct. 29, 1953  8 Sheets-Sheet 5
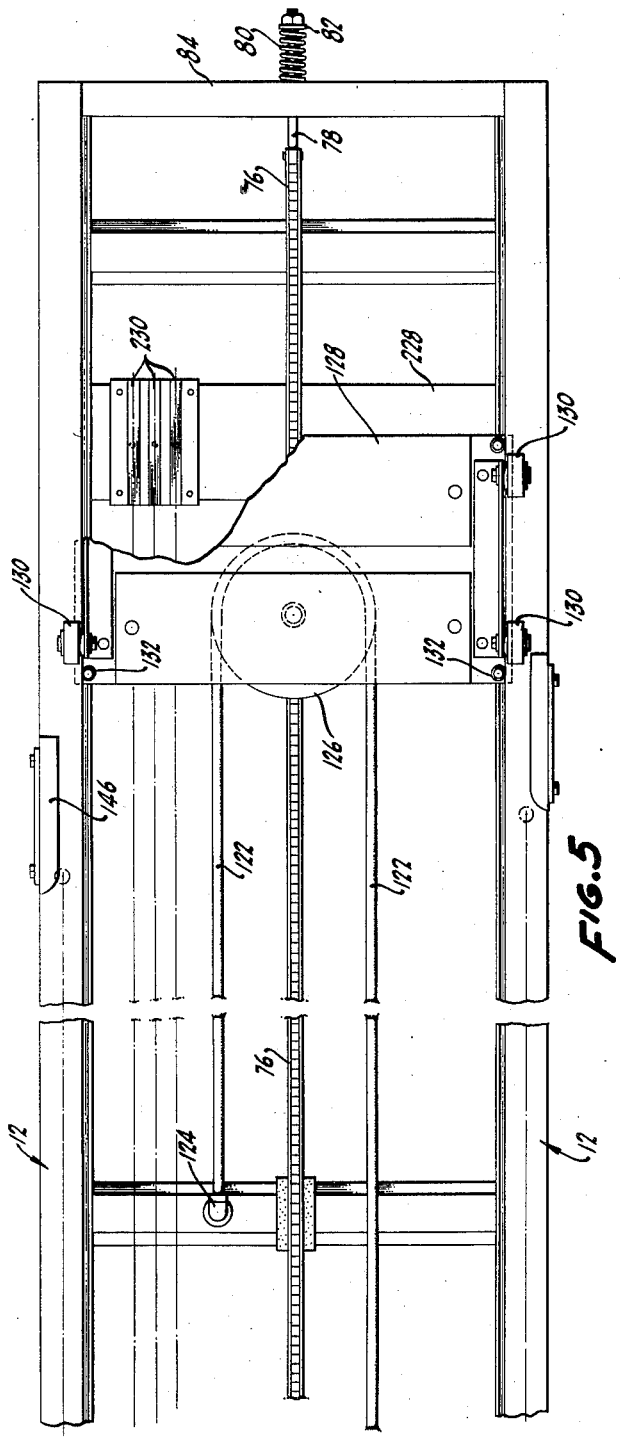
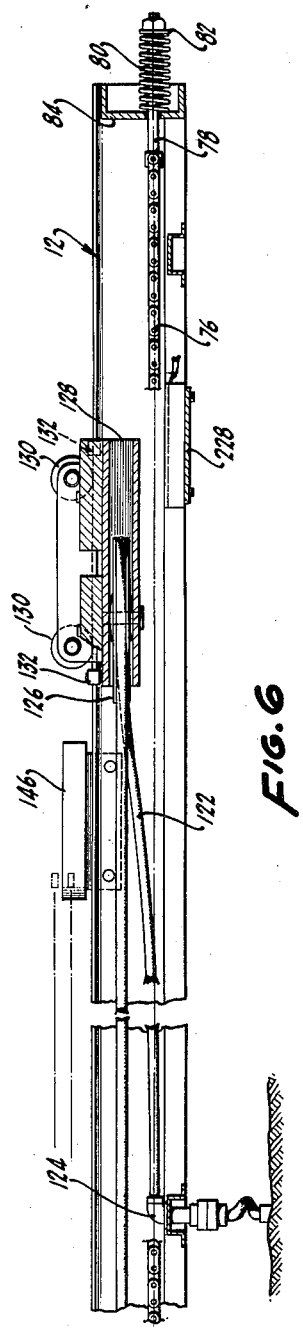
INVENTOR.
SHERMAN A. CAMP
BY
 Naylor and Lassagne
ATTORNEYS July 1, 1958  S. A. CAMP  2,841,093
HILL CLIMBING APPARATUS
Filed Oct. 29, 1953  8 Sheets-Sheet 6

INVENTOR.
SHERMAN A. CAMP
BY
ATTORNEYS

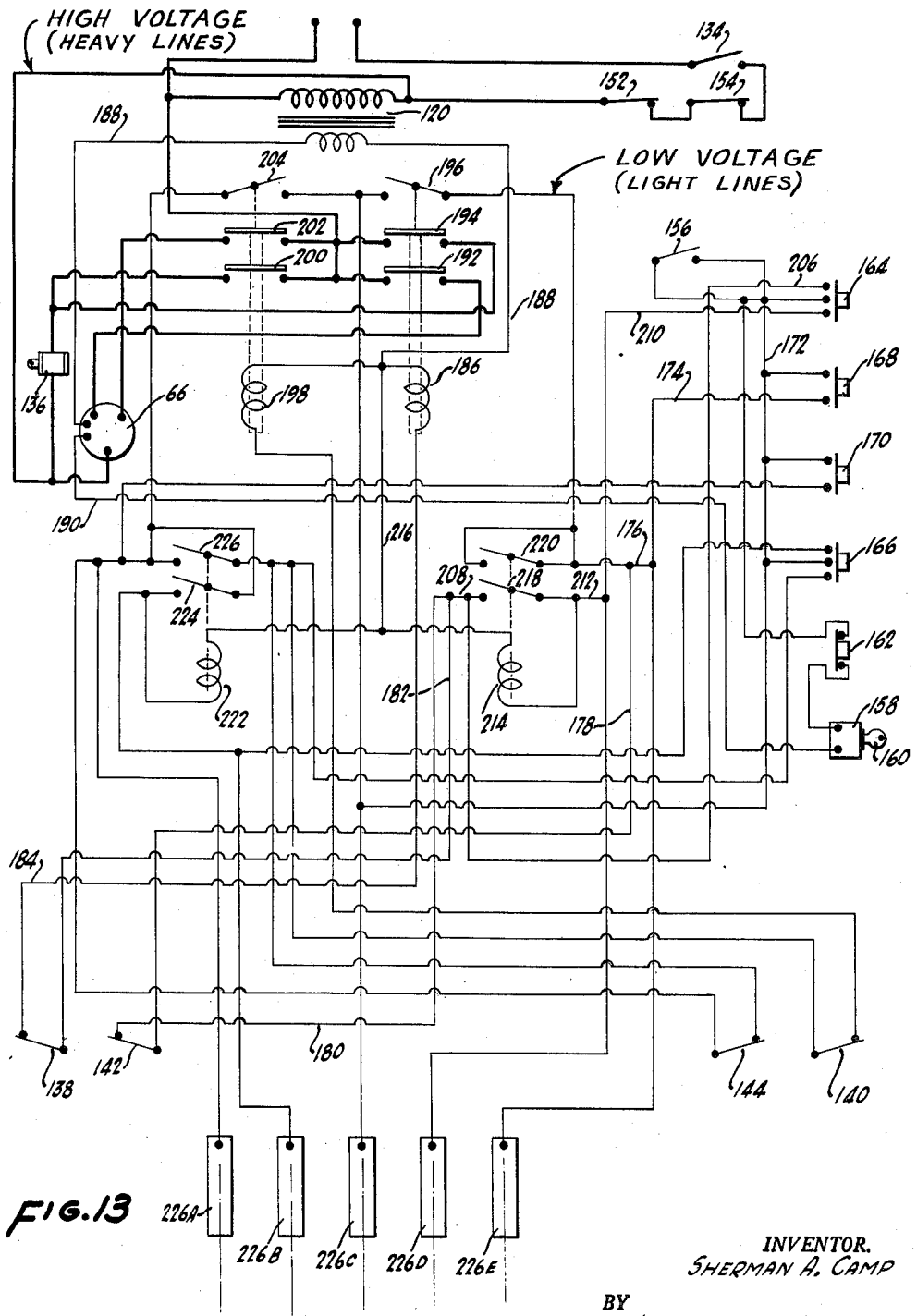

United States Patent Office 2,841,093
Patented July 1, 1958

2,841,093

HILL CLIMBING APPARATUS

Sherman A. Camp, Walnut Creek, Calif.

Application October 29, 1953, Serial No. 389,127

5 Claims. (Cl. 104—235)

This invention relates to hill climbing apparatus, and more particularly to improvements and novel combinations of elements relating to motive-powered hill climbing apparatus of the track-mounted type.

An object of the invention is to provide hill climbing apparatus with a novel form of driving arrangement embodying desirable safety-features including an automatically operable emergency braking system.

A further object of the invention is to embody in electrically powered hill climbing apparatus of the track-mounted type a simple and novel arrangement for relating a power line cable, one end of which is fixed with reference to the apparatus, to the movable apparatus for up and down travel therewith.

Still a further object of the invention is to provide hill climbing apparatus of the electrically powered type with a novel track and car control circuit arrangement of the low voltage type, whereby the car, or carriage, may be either moved by an occupant or a non-occupant to and from top and bottom hill stations and one or more intermediately located stations, without disposing high voltage circuitry elements at any of the various stations.

Other objects and advantages of the invention will be apparent from the following description taken in conjunction with the drawings forming part of this specification, and in which:

Figure 5 is a top plan view of the cable-bearing trailer portion of the apparatus, parts thereof being broken away for purposes of clarity;

Figure 6 is a view in side elevation of that portion of the apparatus shown in Figure 5, with portions thereof being shown in section for purposes of clarity;

Figure 8 is a detail view in section taken along lines 8—8 of Figure 3;

Figure 9 is an enlarged detail view in inside elevation of a track section joint of the apparatus;

Figure 10 is a view in section taken along lines 10—10 of Figure 9;

Figure 11 is an enlarged detail view in front elevation of a door latch and safety switch control arrangement for the carriage of the apparatus;

Figure 12 is a view in section taken along lines 12—12 of Figure 11;

Figure 13 is a diagram of the electrical control circuit arrangement which is disposed on the carriage portion of the apparatus;

Figure 1:
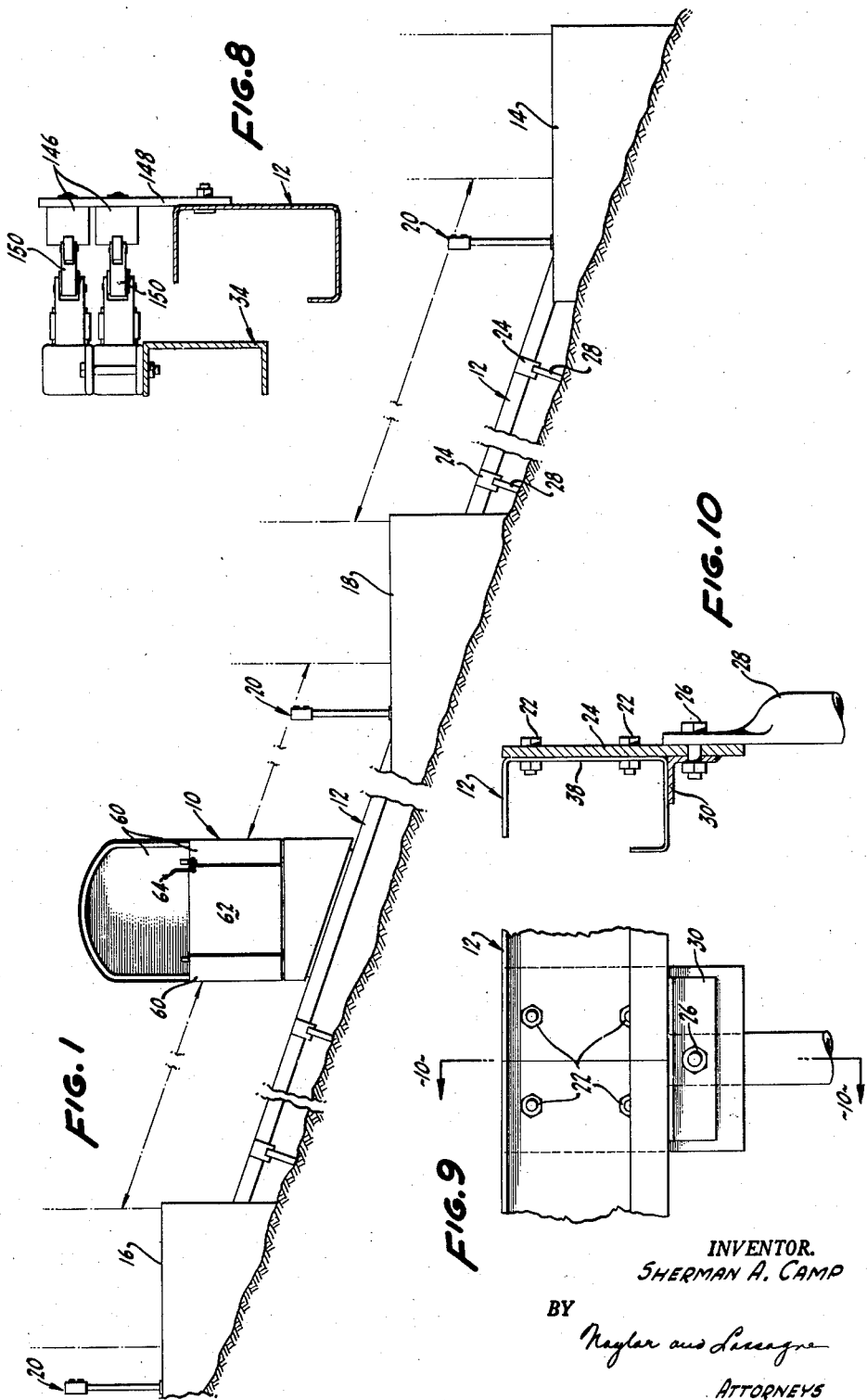
Figure 1 is a view in side elevation of the hill climbing apparatus of the invention.

With reference to Figure 1, the hill climbing apparatus comprises broadly a carriage 10 mounted for controlled travel on tracks 12 between a bottom station 14 and a top station 16, with one or more intermediate stations 18 being provided if desired. The carriage 10 is provided with a set of push button controls, not shown in Figure 1, whereby the electrical control circuits of Figure 13, hereinafter described, may be selectively operated to cause the carriage to be moved to, from and between stations at the will of the operator, while the stations are provided with remote controls 20 whereby the carriage may be called or sent to or from any of the various stations and thereby be remotely controlled.

The rails 12, as best shown in Figures 9 and 10, are semi-closed or box type, in form, with the adjacent ends of abutting sections being mutually secured, as by bolts 22, to plate members 24 which are in turn secured, as by bolts 26 to ground-embedded post members 28. Proper alignment of the adjacently disposed ends of the rail sections is maintained by angle members 30, each of which engages the undersides of two rail ends and is secured in place by a bolt 26.

Mounted on wheels 32 disposed within the box-like rails 12 for travel therealong is a generally rectangular chassis frame 34, said frame being maintained against sidewise movement with respect to the rails by laterally protruding wheels 36 disposed in contact with the vertically disposed side walls 38 of rails 12. Pivotally connected, as at 40 (Figure 2) to frame 34 is the forward end of a motor support platform 42, the rearward end of which is connected by crossing link elements 44 to ears 46 secured to the rearward end of frame 34. Pivotally connected, as at 48, to the forward end of frame 34 is the forward end of a generally rectangular frame 50, the rearward end of which is connected by crossing links 52 to ears 54 secured to the platform 34 at the rearward side thereof. Frame 50 supports a platform 56 serving as the passenger-supporting floor of carriage 10. Secured to the platform, or floor, 56 are superstructure frame-members 58 to which carriage housing panels 60 (Figure 1) may be attached. The housing formed by panels 60 is provided with a pivotally mounted door 62 having latch means 64 hereinafter more specifically described.

In passing, it is pointed out that the provision of the crossing link form of connection between platforms 42 and 50 and chassis frame 34 is a desirable feature inasmuch as it enables a manufacturer of the apparatus to proceed with commercial production of the same at the plant without any concern for the magnitude of the particular angle of incline at the site of installation of a particular hill climbing unit. That is to say, the platforms 42 and 50 are finally secured in place in parallel relation to each other and on the horizontal by trimming the crossing links 44 and 52 to the appropriate lengths at the site of installation, and then securing the lower ends of these links in place.

Figure 7:
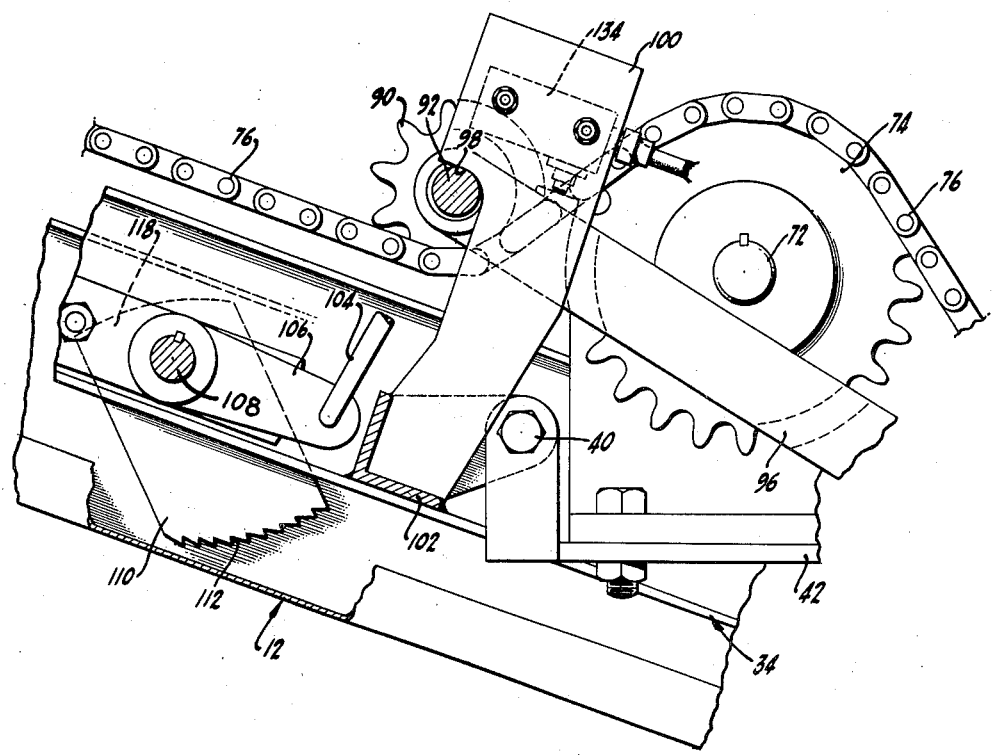
Figure 7 is an enlarged detail view in side elevation of the chain drive portion of the apparatus, with parts thereof being shown in section.

The power system for moving the chassis frame 34 up and down the rails 12 comprises: a reversible electric motor 66 mounted on platform 42 having an output shaft 68; a gear box 70 mounted on platform 42 and connected to said output shaft 68, said gear box having an output shaft 72 which has secured thereto a drive sprocket 74; a stationary chain 76 having a fixed anchor point, not shown, at its upper end and a yieldable anchor point at its lower end (Figures 5 and 6) comprising tie rods 78 and a compression spring 80 disposed between tie rod seat element 82 and apertured rail cross member 84, said chain 76 passing beneath and in engagement with idler sprocket 86 rotatably disposed on chassis frame shaft 88, over in mesh with drive sprocket 74, and under and in mesh with idler sprocket 90 rotatably disposed on stub shaft 92, said latter shaft being carried by the end 94 of lever arm 96, the rearward end 98 of which is journalled on chassis frame shaft 88. The tension in chain 76 which tends to urge lever arm 96 to swing in a clockwise direction (Figure 2) is reacted by engagement of stub shaft 92 with an overlying portion 99 of a bracket member 100 rigidly secured to cross member 102 of chassis frame (see Figure 7) 34.

Fixedly secured to and depending from stub shaft 92 is a crank arm 104, the lower end of which is pivotally attached to an arm member 106 fixedly secured to a shaft 108 rotatably supported by chassis frame 34. Fixedly secured to the outer ends of rotatable shaft 108 and disposed within the rails 12 are emergency braking dogs 110 having toothed lower edges 112.

Figure 2:
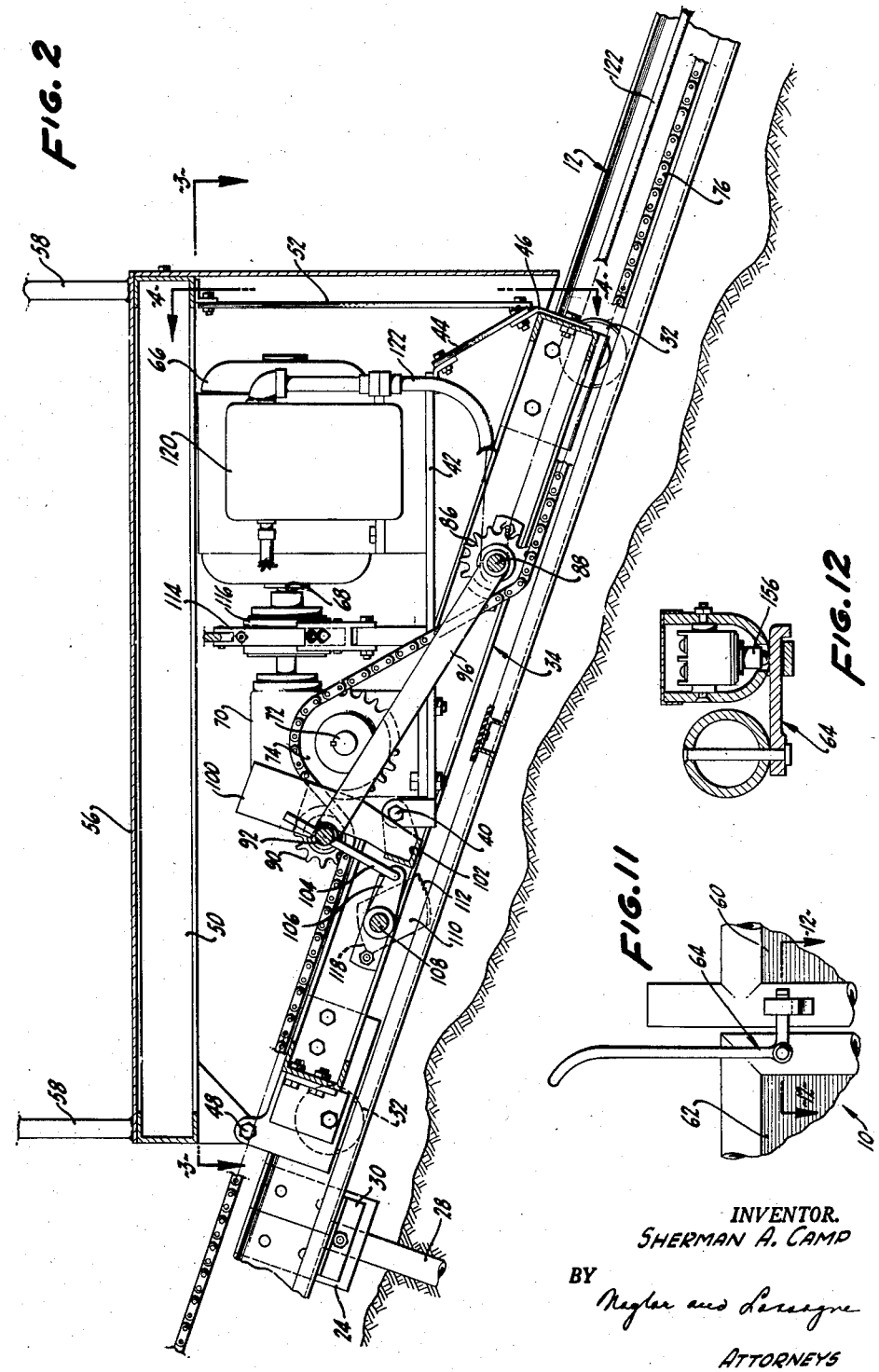
Figure 2 is an enlarged partially sectionalized view in side elevation of the chassis portion of the carriage of the hill climbing apparatus.
Figure 3:
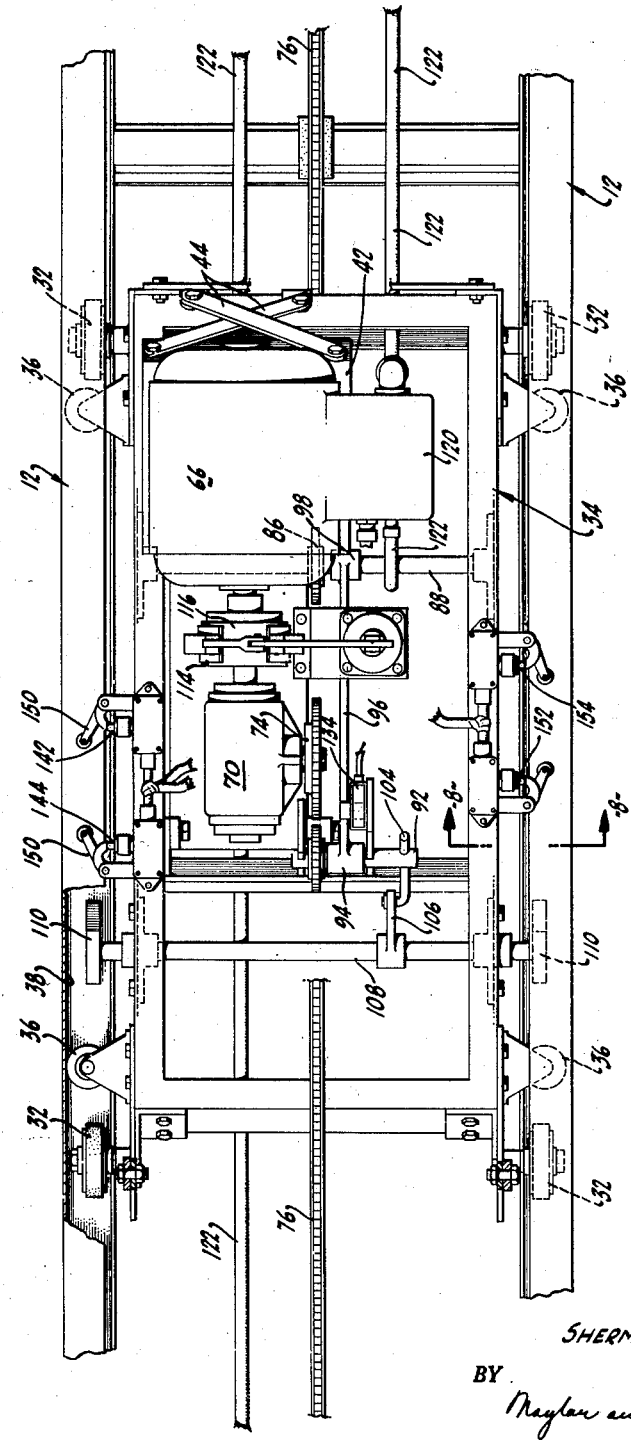
Figure 3 is a view taken along lines 3—3 of Figure 2.
Figure 4:
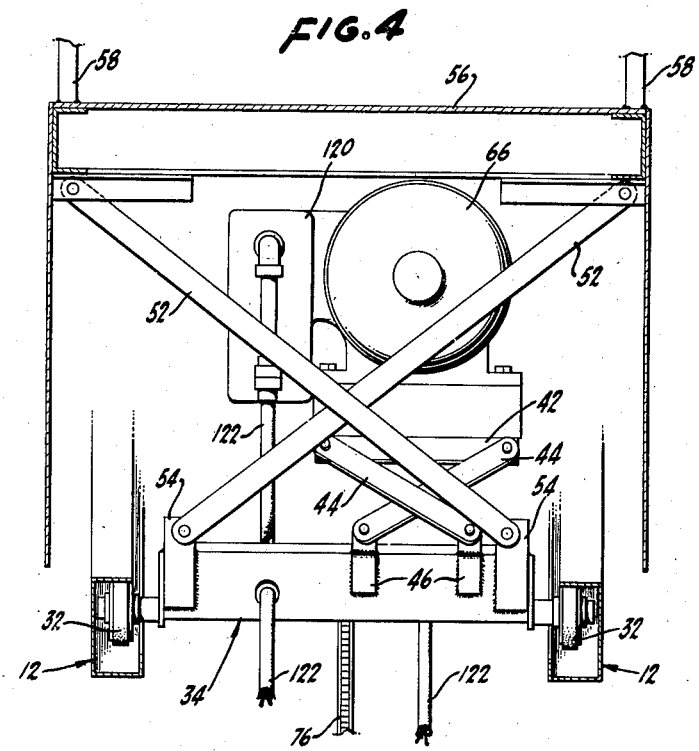
Figure 4 is a view taken along lines 4—4 of Figure 2.
Figures 15, 16:
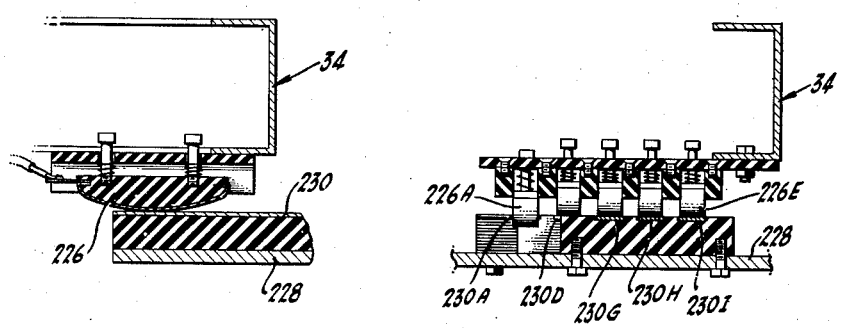
Figure 15 is a partially sectionalized view in end elevation of the carriage to track contact system schematically illustrated in Figure 14.
Figure 16 is a view in side elevation of one of the contact shoes carried by the carriage.

With reference to Figure 2, when the reversible motor 66 is energized by control means hereinafter described to cause drive sprocket 74 to rotate in a clockwise direction, the carriage is caused to travel upwardly. When the motor is reversed to drive sprocket 74 in a counterclockwise direction, the carriage is caused to travel downwardly. When motor 66 is at rest, means are provided, including a solenoid controlled brake 114 associated with brake drum 116 carried by motor output shaft 68, to prevent rotation of sprocket 74, and thereby maintain the carriage in the position on the rails which it occupied when the motor was deenergized.

Motor 66 applies its full torque to sprocket 74 immediately upon energization of the motor to move the carriage upwardly. The abrupt relative movement between the teeth of sprocket 74 and chain 76 tends to cause the chain to become disengaged from the sprocket. Spring 80 prevents such disenagegment by the pulling action it exerts on the chain to maintain it in engagement with sprocket 74.

In the event that the chain 76 becomes broken at a point between the upper end of the chain and the carriage, lever arm 96 falls downwardly to urge crank arm 104 and arm 106 downwardly, thereby imparting a clockwise rotation, with reference to Figure 2, to emergency braking elements 110 and causing the serrated edges thereof 112 to bite into rails 12. As this occurs, portions 118 of braking elements 110 engage the undersides of the tops of rails 12, thus preventing over-center clockwise rotation of elements 110 into a non-braking position. The positive acting emergency braking elements 110 therefor serve to immediately halt the carriage on the rails. Also mounted on platform 42 is a transformer 120 having power input line 122 connected thereto, said power input line having a fixed end 124 (Figures 5 and 6) connected through a suitable ground conduit installation to a source of power, not shown. Between the transformer 120 and the fixed end 124 of cable 122, the cable extends around chassis shaft 88 and down along the trackway to pass around a rotatable sheave 126 carried by a trailer carriage 128 which is supported for travel on rails 12 by wheels 130 and guide rollers 132. Preferably the fixed end 124 of the cable is disposed at approximately the half way point of the trackway, or rail system, 12, with the length of the cable 122 being slightly in excess of one half of the total length of the trackway. With the cable support arrangement described, the trailer carriage 128 travels at one half the speed of the main carriage 10, due to the provision of the traveling rotatable sheave 126. Thus, when the carriage 10 is at the bottom station 14, the carriage 128 is disposed immediately adjacent the main carriage, while when carriage 10 is disposed at the upper station 16, the trailer carriage is disposed adjacent the fixed end 124 of the cable.

The transformer 120, as indicated in Figure 13 which diagrammatically illustrates the control circuitry carried by the carriage 10, steps down the voltage provided through cable 122 from, say 220 volts A. C. to, say, 24 volts. In Figure 13, the high voltage, or power, circuit is shown in heavy lines, while the low voltage, or carriage control, circuit is shown in light lines.

Means are provided in both the high voltage and low voltage circuit portions of the overall circuit arrangement of Figure 13 for the control of the movement of the carriage 10 in response to both the position of the carriage on the trackway and the physical condition of chain 76. Said means comprise a normally opened micro-switch 134 disposed in the high voltage circuit and physically positioned on chassis bracket member 100, said switch being closed by lever arm 96 when said arm is maintained in the position shown in Figures 2 and 7 by chain 76, and said switch being automatically opened when lever arm 96 drops downwardly under a condition of slack in chain 76 or the breaking of said chain. When switch 134 becomes open in this manner, motor 66 is deenergized and brake solenoid 136 is also deenergized. Deenergization of solenoid 136 causes brake 114 to be applied to brake drum 116.

Said position-controlled means, for the low voltage circuit, comprise: a normally closed top station limit switch 138; a normally closed bottom station limit switch 140; a normally closed up-travel limit switch 142 for the intermediate station 18; and a normally closed down-travel limit switch 144 also for the intermediate station 18. These, shown in Figure 13 and partially shown in Figure 8, are carried by the chassis 34 and they are operated by appropriately positioned cam blocks 146 attached to plate elements 148 secured to one of the rails 12. The cam blocks 146 which, as shown in Figure 8, are vertically offset so that the switch for one station will not be operated by the cam block for the switch of another station serve to operate the respective switches through roller bearing yieldingly pivotal arms 150. More explicitly, as carriage 10 reaches top station 16, switch 138 is opened by its associated cam block 146 to stop the carriage in proper relation to the station. When the carriage 10 is being moved upwardly toward station 18, switch 142 is opened. When the carriage is being moved downwardly toward station 18, switch 144 is opened. And when the carriage is being moved to bottom station 14, switch 140 opens to stop the carriage at a proper position with respect to this bottom station.

In the event that the top limit travel switch 138 for the low voltage circuit is not opened when the carriage 10 reaches the normal stopping position at station 16, the high voltage circuit is provided with a normally closed over travel limit switch adapted through control means similar to cam blocks 146 and arms 150 to open the high voltage circuit, while switch 154 performs the same function in the same way as a bottom over travel limit switch.

Additionally, the low voltage, or control, circuitry contains the following control switches: a normally open switch 156 adapted to be closed by the locking of carriage door gate latch 64, thereby enabling the low voltage circuit components to be operated; a locking switch 158 operable, for example, by a key 160 to enable, when in the unlocked condition, the low voltage circuit components to be operated; a normally closed carriage stop switch 162 adapted upon being manually opened to stop the carriage 10 in its immediate position; a normally open top station switch 164 mounted on the carriage and adapted upon being depressed when the carriage is at or below the intermediate station 18 to cause the carriage to be moved to the top station 16; a normally open switch 166 adapted upon being depressed, when the carriage is at or above the intermediate station 18, to cause the carriage to be moved downwardly to bottom station 14; a normally open switch 168 adapted upon being depressed, when the car is below the intermediate station 18, to move the car up to the intermediate station; and a normally open switch 170 adapted upon being depressed, when the car is above the intermediate station 18, to move the car down to the intermediate station.

Assuming that the carriage is positioned at the bottom station 14, the operation of the circuitry of Figure 13 will be described, first, in relation to what happens when button 168 is depressed, and, secondly and in a new operational sequence, in connection with what happens when button 164 is depressed. It will be assumed, of course, for the purpose of such description that switches 134, 138, 142, 144, 152, 154, 156, 158 and 162 are in closed position, and that bottom limit switch 140 is in an opened condition.

When button 168 is depressed, lead 172 is connected to lead 174 to complete the following circuit: 176, 178, switch 142, 180, 182, switch 138, 184, relay coil 186, lead 188, motor 66, lead 190, switches 158, 162 and 156, and lead 172. Energization of coil 186 moves contacts 192, 194 and 196 downwardly to bridge their associated switching contacts, and such causes brake solenoid 136 to be energized to release brake 114 and motor 66 to be energized to drive sprocket 74 in a clockwise direction, with respect to Figure 2. After the carriage has started upwardly, button 168 may be released to return to open position. However, a holding circuit adapted to maintain coil 186 in an energized condition, which circuit includes closed switches 138, 142 and 196, serves to keep the carriage moving after button 168 is released and until up travel limit switch 142 for the intermediate station 18 is opened by its associated cam block. The opening of this switch breaks the holding circuit, resulting in the de-energization of coil 186, the opening of switches and contacts 192, 194 and 196, and the consequent stopping of motor 66 and de-energization of brake solenoid 136 to actuate brake 114.

If the carriage had been at the top station and button 170 had been pushed, it will be appreciated that the carriage 10 would have moved downwardly from the top station until down travel limit switch 144 for the intermediate station had been opened. During this sequence of operation, relay coil 198 would have been energized to close contacts 200, 202 and switch 204, and the holding circuit for coil 198, effective upon release of button 170, would have operated through closed switch 140, 144 and 204.

Assuming now that the carriage 10 is at the bottom station and that control button 164 is depressed. Coil 186 is energized and contacts 192, 194 and switch 196 are closed to de-energize the brake and energize the motor by way of the following circuit: lead 172, lead 206, lead 208, lead 182, switch 138, lead 184, coil 186, lead 188, motor 66, lead 190, switches 158, 162 and 156. At the same time, the following circuit is made: lead 172, lead 210, lead 212, relay coil 214, lead 216, 188, 66 190, 158, 162 and 156. The closing of this latter circuit energizes relay coil 214 to close switch contacts 218 and 220. The closing of switch contact 218 sets up a holding circuit against the manual release of button 164 and the opening of up travel limit switch 142 for the intermediate station, thereby insuring that the carriage will move upwardly to the top station and will only stop when top limit switch 138 is opened. The opening of switch 138 serves to de-energize the motor and set the brake.

If the carriage had been at the top station and button 166 were pushed, it will be appreciated that the energization of relay coil 222 would have closed contacts 224 and 226, thus constituting a holding circuit for coils 198 and 222 which would include bottom travel limit switch 140, but which holding circuit would be independent of the release of button 166 and the opening of down travel limit switch 144 for the intermediate station. The carriage would thus only stop when the bottom limit switch 140 were opened.

Figure 14:
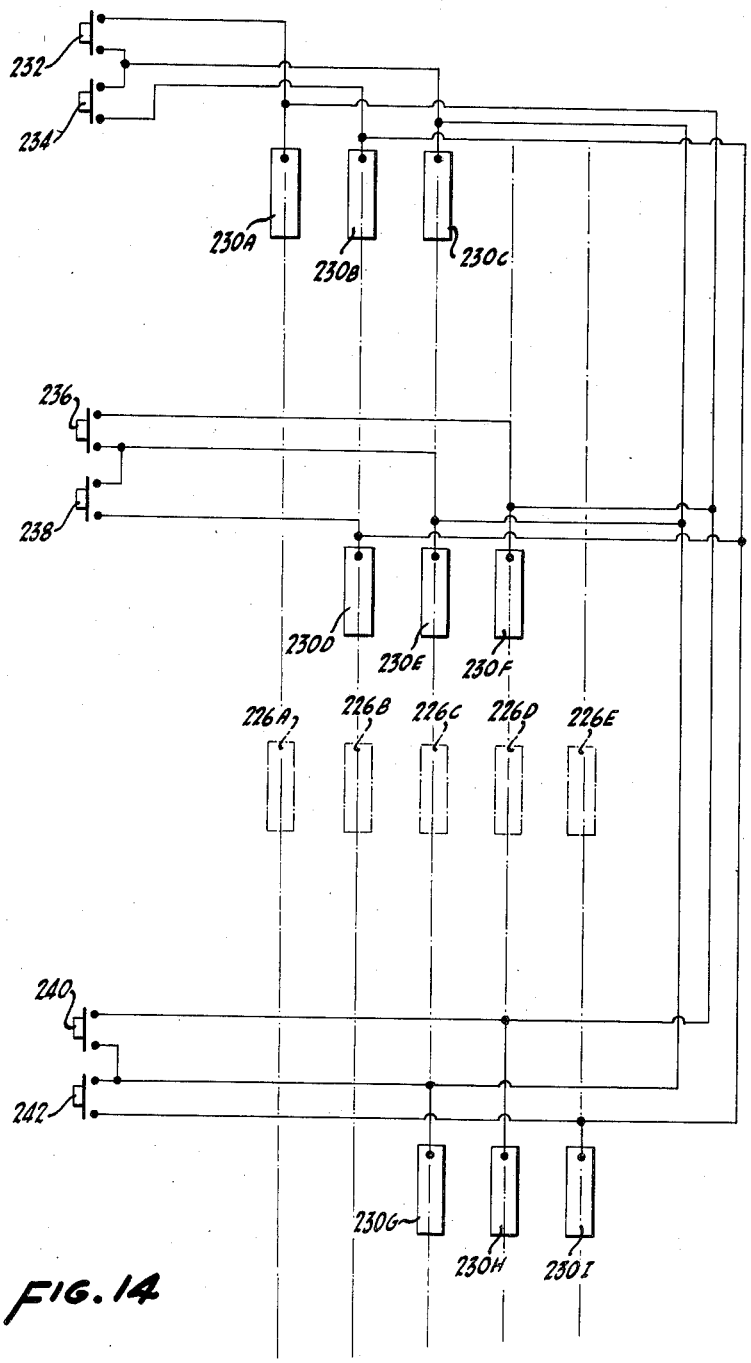
Figure 14 is a diagram showing the control station and track electrical circuitry.

Figure 14 diagrammatically illustrate a track wiring diagram which in conjunction with the carriage-borne wiring diagram of Figure 13 enables the carriage to be remotely controlled from the various stations. In order to accomplish this result, the chassis frame 34 portion of the carriage 10 is provided with a plurality of resiliently mounted electrical contactors, or shoes, 226 (Figures 13-16) and station-located trackway cross members 228 are provided with a plurality of spaced parallel contact strips 230 which are circuit-connected in the manner shown in Figure 14. Reference notations 230A, 230B and 230C designate the fixed track contacts which are disposed adjacent the top station 16; 230D, 230E and 230F designate the contacts for the intermediate station 18; and 230G, 230H and 230I indicate the contacts for the bottom station 14. 226A-E designate the chassis-borne contacts, or shoes.

The controls 20 at the top station 16 consists of normally open push button switches 232 and 234; those at station 18 consist of push button switches 236 and 238; while those at bottom station 14 consist of push button switches 240 and 242. It will be appreciated that the button controls 232—242 acting through the track wiring diagram of Figure 14 and the carriage shoes 226, which are part of the carriage-borne circuitry of Figure 13, serve the same carriage control functions as the control buttons 164—170 of Figure 13.

Thus, with the carriage at the bottom station the closing of switch 232 causes carriage shoes 226C and 226D to be electrically interconnected, by virtue of their contact, respectively, with track contacts 230G and 230H, the latter contacts being in circuit with switch 232, to cause the same carriage movement results as that previously described for the closing of carriage-borne switch 164. That is to say, the carriage will be called to the top station. Once the track to carriage contacts are broken upon movement of the carriage, the same holding circuits as those previously described in connection with the operation of the carriage-borne controls are operative to cause the carriage to continue to move. Similarly, when the carriage is at the intermediate station and switch 232 is closed, carriage shoes 226C and 226D will again be bridged by the circuit containing switch 232 and track contacts 230E and 230F, with the result that the carriage will be called from the intermediate station to the top station. When the carriage is at the top station and the switch 232 is closed, carriage-borne shoes 226A and 226C will be interconnected through the circuitry comprising switch 232 and track contacts 230A and 230C, with the result that the carriage will be sent from the top station to the intermediate station in the same manner as such movement would occur were carriage-borne control switch 170 closed. Switch 232 may therefore be used, depending upon the position of the carriage, to move the carriage in either direction, and this is made possible by the staggered positioning of the track contacts from one station to the next and the provision of a sufficient number of carriage-borne shoes to enable selective contacting of all of the track contacts.

When the carriage is at either the top station or the intermediate station, it will be moved downwardly to the bottom station by the closing of switch 234 in the same manner as that previously described in connection with the closing of carriage-borne switch 166. When the carriage is at the bottom station, it will be moved up to the intermediate station by the closing of switch 234 by the bridging of carriage-borne shoes 226C and 226E, the same being comparable to what occurs when carriage-borne switch 168 is closed when the carriage is at the bottom station.

When the carriage is at the top station, it will be moved down to the intermediate station when switch 236 is closed by virtue of the bridging of shoes 226A and 226C, the same being the control equivalent of closing carriage-borne switch 170 when the carriage is at the top station. When the carriage is at either the center station or at the bottom station, it will be moved up to the top station by the closing of switch 236, again by virtue of the bridging of shoes 226C and 226D.

When the carriage is at the bottom station, it will be moved up to the center station by the closing of switch 238, again by virtue of the bridging of shoes 226C and 226E, the same being comparable to the closing of carriage-borne switch 168. When the carriage is at the center station, it will be moved down to the bottom station by the closing of switch 238, again by virtue of the bridging of shoes 226B and 226C, the equivalent of the closing of carriage-borne switch 166.

When the car is at either the bottom or center station, the closing of switch 240 causes a bridging of shoes 226C and 226D to move the carriage up to the top station. With the carriage at the top station, the closing of switch 240 bridges shoes 226A and 226C to bring the carriage down to the center station.

The closing of switch 242, when the car is at the bottom station, causes shoes 226C and 226E to be bridged to bring the car up to the center station. The closing of switch 242, when the carriage is at either the top or the center station, causes shoes 226B and 226C to be bridged to bring the car down to the bottom station.

What is claimed is:

1. Hill climbing apparatus comprising a pair of parallel ground-supported upwardly inclined tracks, a carriage mounted on said tracks by roller wheel support means for two way movement thereon, a chain disposed between said tracks and parallel thereto for substantially the full length thereof, fastening means for the ends of said chain, said chain extending under and being in mesh with a first idler sprocket carried by said carriage, over and in mesh with a driving sprocket mounted on said carriage, and under and in mesh with a second idler sprocket, said second idler sprocket being mounted on a stub shaft carried by a lever arm disposed parallel to said tracks and mounted on said carriage for pivotal movement about a horizontal axis, a stop member mounted on said carriage to engage said stub shaft to inhibit the lifting of said stub shaft under the tensioning force of said chain, braking elements pivotally connected to said carriage in juxtaposed relation to said tracks operable to pivotally move into braking engagement with said tracks, a crank lever connection between said stub shaft and said braking elements operable to support said braking elements out of engagement with said tracks when said stub shaft is in engagement with said stop member under the tensioning force of said chain and operable to pivot said elements into braking engagement with said tracks when said lever arm is caused to rock downwardly in response to slackness in said chain or the breaking thereof to move said stub shaft out of engagement with said stop member, and reversible power means mounted on said carriage for rotating said driving sprocket in either direction of rotation.

2. Hill climbing apparatus as set forth in claim 1, said tracks having inwardly directed upper and lower flange portions between which, and in engagement with the latter, said roller wheel support means are disposed, with said braking elements being disposed between said upper and lower flange portions, said elements being shaped and dimensioned to wedgingly engage both said upper and lower flange portions of said tracks under the releasing action of chain slackness or chain break.

3. Electrically powered hill climbing apparatus comprising an angularly disposed two rail trackway, a wheel-mounted elevator carriage supported on said trackway for movement thereon, means including an electric motor disposed on said carriage for moving the carriage along said trackway, a power cable having an end fixed to said carriage and serving to supply power to said motor, said cable extending from the rearward end of said carriage between said tracks and having a fixed ground connection between said tracks at a point approximately midway with respect to the length of said track, a trailer carriage mounted for travel on said trackway in trailing relation to said elevator carriage, and a sheave carried at the underside of said small carriage between the rails of said trackway, said sheave being rotatable in a plane parallel to the plane of said trackway, with said cable extending from said ground connection around said sheave to said carriage, whereby said elevator carriage overtakes said trailer carriage.

4. Hill climbing apparatus comprising a pair of parallel ground-supported upwardly inclined tracks having inwardly directed upper and lower flange portions, a carriage having roller wheel support means in engagement with said tracks and disposed between said upper and lower flange portions, a chain, having upper and lower ends, disposed between said tracks and parallel thereto for the full length thereof; fastening means for the ends of said chain including means for yieldingly fastening one end thereof, said chain extending under and being in mesh with a first idler sprocket, which is secured to said carriage for rotative movement only, over and in mesh with a driving sprocket rotatably mounted on said carriage, and under and in mesh with a second idler sprocket, which is rotatably carried by first lever means providing a connection with said carriage enabling a pivotal movement of said second sprocket in a vertical plane, reversible power means mounted on said carriage for rotating said driving sprocket in either direction of rotation, emergency braking plates pivotally carried by said carriage and having toothed ends normally maintained out of engagement with the upper and lower flange portions of said tracks by second lever means interconnecting said plates and said first lever means, means to prevent upward movement of said second idler sprocket under the action of said chain, said first lever means being operable to drop to cause said second lever means to pivot said plates to bring the toothed ends thereof into biting engagement with the lower flange portions of said tracks upon the occurrence of slack in said chain or the breaking thereof at a point between the upper end of said chain and said carriage.

5. Hill climbing apparatus comprising a pair of parallel ground-supported upwardly inclined tracks, a carriage supported by wheels for movement along said tracks, stationary chain means, having upper and lower anchored ends, extending parallel to said tracks and disposed thereabove, said chain means being connected to a powered sprocket mounted on said carriage for moving the carriage along said tracks relative to said chain means, braking plates pivotally attached to said carriage for upward and downward rocking movement in a vertical plane, said plates being operable upon downward rocking movement to engage said tracks and inhibit movement thereon of said carriage, and means attached to said plates and disposed in engagement with said chain means operable to prevent downward rocking movement of said plates when said chain means is in a taut condition, said plates being adapted to rock downwardly under the action of gravity to engage said tracks when said chain means breaks at a point between said carriage and the upper end of said chain means.

References Cited in the file of this patent

UNITED STATES PATENTS

| | | |
|---|---|---|
| 38,800 | Agudio | June 9, 1863 |
| 272,429 | Gurney | Feb. 20, 1883 |
| 368,325 | Crane et al. | Aug. 16, 1887 |
| 413,158 | Askew | Oct. 22, 1889 |
| 424,833 | Stut | Apr. 1, 1890 |
| 425,226 | Henne | Apr. 8, 1890 |
| 588,122 | Bittner | Aug. 17, 1897 |
| 643,674 | Muirhead | Feb. 20, 1900 |
| 996,653 | Lawson | July 4, 1911 |
| 1,100,139 | Mayers | June 16, 1914 |
| 1,220,122 | Hewitt | Mar. 20, 1917 |

(Other references on following page)

UNITED STATES PATENTS

| | | | |
|---|---|---|---|
| 1,478,676 | Richey | Dec. 25, | 1923 |
| 1,485,653 | Walters | Mar. 4, | 1924 |
| 1,486,922 | Ross | Mar. 18, | 1924 |
| 1,579,035 | Ryan | Mar. 30, | 1926 |
| 1,583,785 | Evans | May 11, | 1926 |
| 1,907,974 | Johnston | May 9, | 1933 |
| 2,286,119 | Sloane | June 9, | 1942 |
| 2,355,148 | Clay | Aug. 8, | 1944 |
| 2,443,546 | Weggum | June 15, | 1948 |
| 2,447,669 | Riley | Aug. 24, | 1948 |
| 2,511,513 | Rempt et al. | June 13, | 1950 |
| 2,581,887 | Saxton et al. | Jan. 8, | 1952 |
| 2,619,196 | Scott | Nov. 25, | 1952 |
| 2,719,607 | Scott | Oct. 4, | 1955 |

FOREIGN PATENTS

| | | | |
|---|---|---|---|
| 40,005 | France | Dec. 28, | 1931 |
| 149,155 | Germany | Mar. 3, | 1904 |